Feb. 6, 1962     C. F. STAPLES     3,019,639
SURFACE INDICATORS
Filed July 7, 1958     2 Sheets-Sheet 1
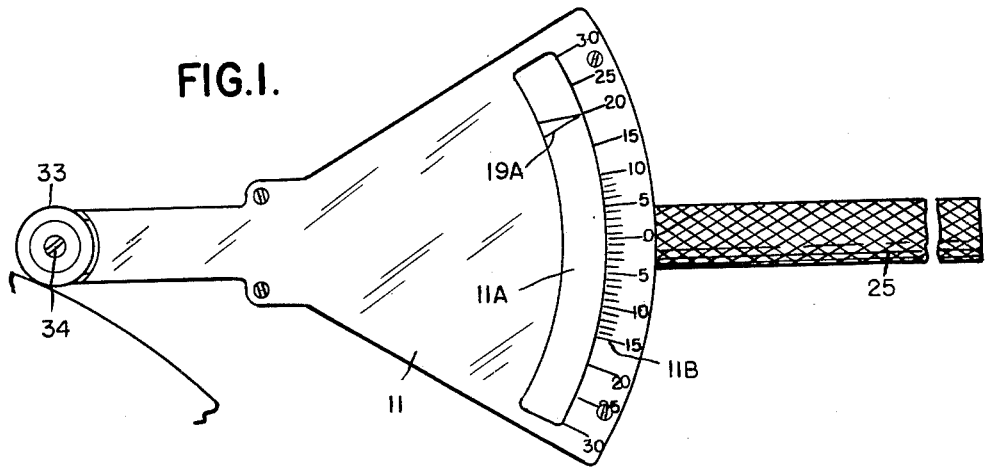
FIG.1.
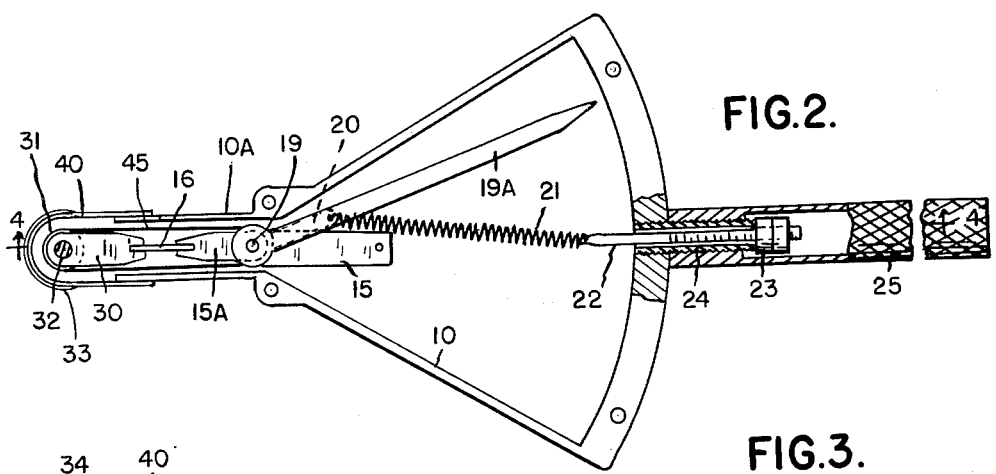
FIG.2.
FIG.3.
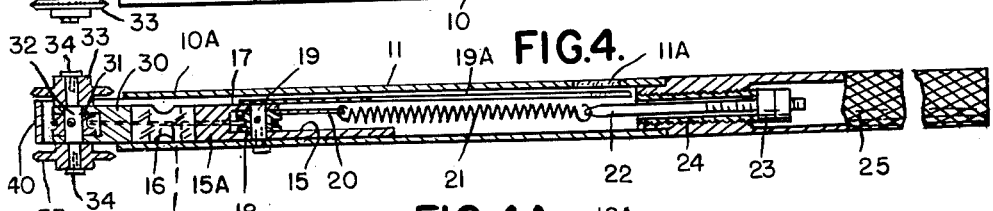
FIG.4.
FIG.4A.
INVENTOR.
CHARLES F. STAPLES
By Frank V. Hardesty
ATTORNEYS Feb. 6, 1962 — C. F. STAPLES — 3,019,639
SURFACE INDICATORS
Filed July 7, 1958 — 2 Sheets-Sheet 2
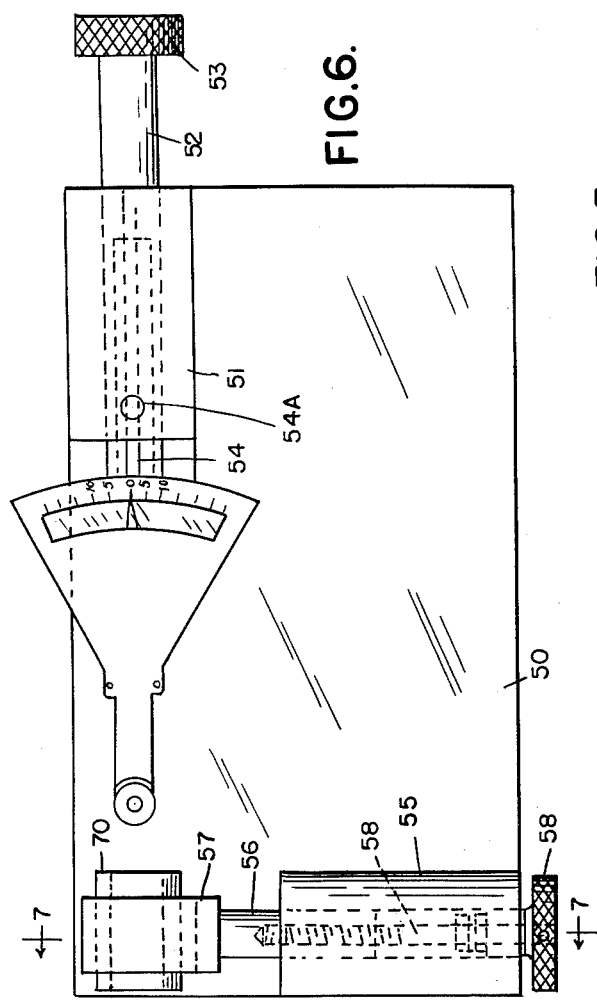
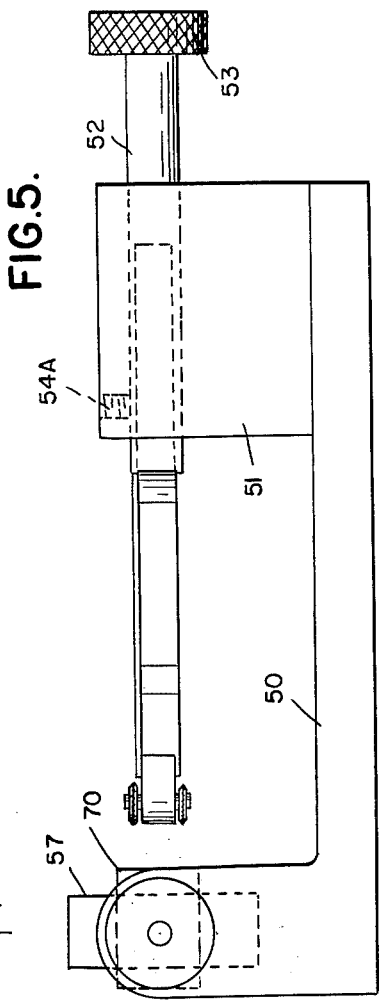
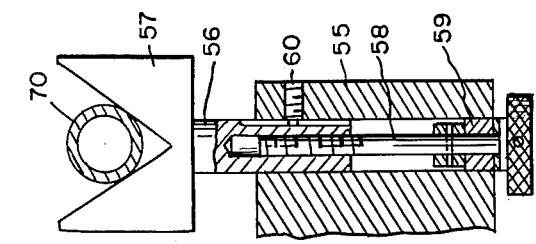
INVENTOR.
CHARLES F. STAPLES
BY Hauke & Hardesty
ATTORNEYS

United States Patent Office 3,019,639
Patented Feb. 6, 1962

3,019,639
SURFACE INDICATORS
Charles F. Staples, 1315 S. Woodward Ave.,
Birmingham, Mich.
Filed July 7, 1958, Ser. No. 746,889
8 Claims. (Cl. 73—105)

The present invention relates to indicators for determining the smoothness of surfaces after finishing.

In many mechanical applications, the frictional smoothness of a surface becomes a vital factor either in the operation or the life, or both, of a given element and even after grinding and honing, imperfections in the surface may remain which increase the frictional coefficients in use of the element.

It is among the objects of the present invention to provide means for detecting and indicating the extent of such imperfections.

Another object is to provide an indicator which may be easily and quickly used for such detection by one not specially trained.

Another object is to provide an indicator which is compact, readily portable, and one that will not easily get out of order.

Still another object is to provide an indicator which, though ruggedly built, will detect on a surface variations measuring very minute fractions of an inch.

Other objects and advantages will readily occur to those skilled in the art upon reference to the following description and the accompanying drawings in which FIG. 1 is a plan view of an indicator involving the present invention.

FIG. 2 is a similar view with the cover plate removed and with parts in section.

FIG. 3 is a side view of the indicator.

FIG. 4 is a section on line 4—4 of FIG. 2.

FIG. 4A is an enlargement of a part of FIG. 4.

FIG. 5 is a side elevation of a fixture for holding the indicator for production inspection of bushings.

FIG. 6 is a plan view of the same.

FIG. 7 is a section on line 7—7 of FIG. 6.

As shown in the drawings, an indicator involving the present invention will comprise a sector shaped frame 10 which also constitutes a housing for a portion of the mechanism, other parts of the mechanism being enclosed in an extension 10A at the apex of the sector. A suitable cover plate 11 having an arcuate window 11A with a graduated scale 11B alongside, will be attached.

Within the frame 10 and fixed to the back plate thereof, as by spot welding, is a sub-frame 15 which, as shown in FIGS. 2 and 4, is provided with a nose portion 15A in the end of which is fixed a leaf spring 16.

As shown in FIG. 4, the sub frame 15 comprises a leaf extension, providing a part suitable for welding to the main frame, and the rearward portion of the nose 15A is provided with notch or yoke 17 between the arms of which is mounted a small pulley 18 rotatable with a shaft 19 to which it is fixed. Shaft 19 is rotatably mounted in the arms of yoke 17 and extends beyond the shorter arm and has fixed thereto an indicator hand or pointer 19A the free end of which lies under and is visible through window 11A. Fixed to the pulley, preferably between the yoke arms, is a short arm 20, to the end of which is attached a light tension helical spring 21, the other end of which is attached to an adjusting screw 22 passing freely through the arcuate end of the frame 10 and provided with an adjusting nut or nuts 23. It is preferred to provide, at the point where the screw passes through the frame, an externally threaded sleeve or boss 24 serving as an abutment for the nut 20 and also providing attachment for a hollow handle 25.

To the leaf spring 16 fixed in the nose 15A of the sub-frame, is fixed a yoke member 30 between the arms of which is a small pulley 31 arranged in alignment with pulley 18 and fixed to a shaft 32 rotatable in the yoke arms, and upon the extending ends of shaft 32 are fixed a pair of small wheels 33, these being shown as fixed to the shaft 32 by means of small screws 34 in the shaft ends.

As indicated in FIG. 4, the yoke member 30 extends beyond the end of frame extension 10A and, being supported upon spring 16, may swing thereon a substantial distance unless prevented from doing so. So, in order to limit such swinging and provide for uniform and predetermined spring pressure of the wheels 33 on a surface, a shield or stop is provided. This shield or stop is shown at 40 as a metal strip over the wheel carrying yoke member 30 and fixed to the side walls of frame extension 10A, being spaced from the yoke member to allow necessary movement of the latter. It is also located close to the line of contact of the wheels 33 with a surface to be examined, so that the said limited movement is quite small—say around $\frac{1}{32}$ of an inch. Thus, when pressure is applied, the leaf spring 16 flexes until the shield contacts the surface of the work, the leaf spring 16 causing the wheels to engage the surface of the work with a uniform pressure, regardless of the manually applied pressure.

Further, the width of the stop member 40 should be such that its lateral edges are as close as practicable to the adjacent faces of the wheels.

The wheels 33 are operatively connected to the indicator hand 19 by means of a belt 45, preferably of piano wire, passing around the pulleys 31 and 18, so that any rotative movement of wheels 33 will swing the hand 19, the lever 20 and hand 19 being so arranged that the hand 19 occupies a central position relative to the scale on the cover when the device is idle.

In using the indicator to inspect a surface, the wheels 33 are pressed against the surface and drawn or pushed along. The guard 40 contacting the surface limits the pressure of the wheel 33 to that exerted by the spring 16. Any imperfection encountered by one or both of the wheels will produce friction causing a rotative movement of the wheel or wheels and such movement will be indicated by the pointer 19A. The scale 11B indicates the degree of frictional resistance and may be related to any acceptable standard.

One of the principal uses of the indicator will be the examination of the inner surface of a bushing and this will be more expeditiously and accurately accomplished by means of a fixture such as is shown in FIGS. 5, 6 and 7.

In these figures, a suitable base 50 is shown as provided at one end with a fixed block 51 having a longitudinal passage therethrough in which is slidably carried an operating holder 52, this being a member having at one end a knob or handle 53 and being bored at its other end to receive the handle 25 of the indicator. Member 52 is also preferably slotted as at 54 to receive the inner end of a guide screw 54A which will allow longitudinal movement but no rotation.

The indicator handle may be fixed in the base of member 52 by any suitable means (not shown).

Upon the diagonally opposite corner of the rectangular base 50 is another block 55 suitably bored horizontally to receive a slide 56 having fixed to its outer end a V-block 57. The inner end of slide 56 is bored axially and internally threaded to receive an adjusting screw 58 rotatably mounted in a block 59 in the end of the bore, the slide 56 being prevented from rotation by a suitable screw 60 coacting with a slot in the slide.

With the V-block properly located, a bushing or series of bushings such as is indicated at 70 may be quickly and easily examined by using the indicator which may be moved into and through the bushing using the handle 53.

I claim:

1. A device for detecting and indicating the extent of surface imperfections, comprising a sector shaped frame having an extension at the apex thereof, a sub frame fixed within said frame and having a portion lying within said extension, a shaft rotatably mounted in said sub frame with its axis normal to the plane of the frame, said shaft having fixed thereto an indicator hand, a leaf spring fixed at one end to said sub frame and having fixed to its other end a member carrying a rotatable shaft, surface contacting wheels fixed to said last mentioned shaft and means for transmitting rotative movement of said wheels to the shaft carrying the indicator hand.

2. A device for detecting and indicating the extent of surface imperfections, comprising a sector shaped frame having an extension at the apex thereof, a sub frame fixed within said frame and having a portion lying within said extension, a shaft rotatably mounted in said sub frame with its axis normal to the plane of the frame, said shaft having fixed thereto an indicator hand, a leaf spring fixed at one end to said sub frame and having fixed to its other end a member carrying a rotatable shaft, surface contacting wheels fixed to said last mentioned shaft, means for transmitting rotative movement of said wheels to the shaft carrying the indicator hand, and spring means resisting the rotation of the latter shaft.

3. In a surface indicator, a pair of wheels adapted to contact a surface to be examined, a member carrying said wheels, said member being fixed to the free end of a leaf spring thereby permitting said wheels and member to be moved with flexing of said spring, and means for limiting such movement, the other end of said leaf spring being fixed to a frame structure housing said member, said means consisting of a shield extending over the wheel carrying member and spaced therefrom, the outer face of said shield lying within the plane of the perimeters of said wheels and the edges of said shield extending to closely adjacent the treads of said wheels, said shield having an arcuate outer surface of a radius slightly smaller than the radius of said wheels and substantially concentric therewith.

4. In a surface indicator, a frame structure, a pair of wheels adapted to contact a surface to be examined, a first rotatable shaft upon the ends of which said wheels are fixed, a first yoke member provided with bearings in its arms for said first shaft, a first pulley fixed to said first shaft between the arms of said first yoke, a second yoke secured to said frame structure and rotatably carrying a second shaft in its arms, the free ends of said yoke members being connected by a spring member, said second shaft being spaced from and parallel with said first shaft and having an indicator hand fixed thereto, a second pulley fixed to said second shaft, and a belt connecting said pulleys.

5. A device for detecting and indicating the extent of surface imperfections, comprising a sector shaped frame having an extension at the apex thereof, a sub frame fixed within said frame and having a portion lying within said extension, a shaft rotatably mounted in said sub frame with its axis normal to the plane of the frame, said shaft having fixed thereto an indicator hand, an indicator scale adjacent the tip of said indicator hand, a leaf spring fixed at one end to said sub frame and having fixed to its other end a member carrying a rotatable shaft, surface contacting wheels fixed to said last mentioned shaft and means for transmitting rotative movement of said wheels to the shaft carrying the indicator hand, said means comprising a pulley fixed to each of the beforementioned shafts, a belt over said pulleys whereby to transmit rotative movement of said wheels to the shaft carrying said indicator hand, and means for limiting the movement of said wheels when said leaf spring is flexed.

6. A device for detecting and indicating the extent of surface imperfections, comprising a sector shaped frame having an extension at the apex thereof, a sub frame fixed within said frame and having a portion lying within said extension, a shaft rotatably mounted in said sub frame with its axis normal to the plane of the frame, said shaft having fixed thereto an indicator hand, an indicator scale adjacent the tip of said indicator hand, a leaf spring fixed at one end to said sub frame and having fixed to its other end a member carrying a rotatable shaft, surface contacting wheels fixed to said last mentioned shaft and means for transmitting rotative movement of said wheels to the shaft carrying the indicator hand, said means comprising a pulley fixed to each of the beforementioned shafts, a belt over said pulleys whereby to transmit rotative movement of said wheels to the shaft carrying said indicator hand, and means for limiting displacement of said wheels when said leaf spring is flexed, said limiting means consisting of a metal strip of a width only slightly less than the distance between the treads of said wheels, said strip being fixed at its ends to said frame and extending over but spaced from the wheel carrying member.

7. A device for detecting and indicating the extent of surface imperfections, comprising a sector shaped frame having an extension at the apex thereof, a sub frame fixed within said frame and having a portion lying within said extension, a shaft rotatably mounted in said sub frame with its axis normal to the plane of the frame, said shaft having fixed thereto an indicator hand, an indicator scale adjacent the tip of said indicator hand, a leaf spring fixed at one end to said sub frame and having fixed to its other end a member carrying a rotatable shaft, surface contacting wheels fixed to said last mentioned shaft and means for transmitting rotative movement of said wheels to the shaft carrying the indicator hand, said means comprising a pulley fixed to each of the beforementioned shafts, a belt over said pulleys whereby to transmit rotative movement of said wheels to the shaft carrying said indicator hand, spring means for resisting the movement of said hand, and means for limiting displacement of said wheels when said leaf spring is flexed.

8. A device for detecting and indicating the extent of surface imperfections, comprising a sector shaped frame having an extension at the apex thereof, a sub frame fixed within said frame and having a portion lying within said extension, a shaft rotatably mounted in said sub frame with its axis normal to the plane of the frame, said shaft having fixed thereto an indicator hand, a leaf spring fixed at one end to said sub frame and having fixed to its other end a member carrying a rotatable shaft, surface contacting wheels fixed to said last mentioned shaft and means for transmitting rotative movement of said wheels to the shaft carrying the indicator hand, a pulley fixed to each of the beforementioned shaft, a belt over said pulleys whereby to transmit rotative movement of said wheels to the shaft carrying said indicator hand, spring means for resisting the movement of said hand, means for varying the effect of said spring means, and means for limiting the movement of said wheels when said leaf spring is flexed.

References Cited in the file of this patent
UNITED STATES PATENTS

| | | |
|---|---|---|
| 2,491,016 | Reason | Dec. 13, 1949 |
| 2,691,887 | Rinker | Oct. 19, 1954 |
| 2,821,081 | Staples | Jan. 28, 1958 |

FOREIGN PATENTS

| | | |
|---|---|---|
| 559,623 | Great Britain | Feb. 28, 1944 |